(12) United States Patent
Segal

(10) Patent No.: US 6,389,783 B1
(45) Date of Patent: May 21, 2002

(54) FRUIT INJECTOR

(75) Inventor: Eric Segal, c/o All4Fun Consumer Products Ltd. 38 Hollywood Avenue, North York Ontario (CA), M2N 6S5

(73) Assignee: Eric Segal, North York (CA)

( * ) Notice: Subject to any disclaimer, the term of this patent is extended or adjusted under 35 U.S.C. 154(b) by 0 days.

(21) Appl. No.: 09/791,609

(22) Filed: Feb. 26, 2001

Related U.S. Application Data

(60) Provisional application No. 60/234,945, filed on Sep. 26, 2000.

(51) Int. Cl.[7] .................................. B65B 63/02
(52) U.S. Cl. ............................ 53/527; 53/115
(58) Field of Search .................... 53/115, 258, 527, 53/529, 530; 100/132, 133; 99/485

(56) References Cited

U.S. PATENT DOCUMENTS

| | | | | |
|---|---|---|---|---|
| 1,759,357 A | * | 5/1930 | Lacey | 53/258 |
| 3,030,748 A | * | 4/1962 | Moses | 53/115 |

* cited by examiner

*Primary Examiner*—Scott A. Smith
*Assistant Examiner*—Nathaniel C. Chukwurah
(74) *Attorney, Agent, or Firm*—Paul S. Sharpe; Marks & Clerk

(57) ABSTRACT

A fruit injector for squeezing a fruit segment into a container, particularly, a beer bottle. A channel shaped body includes a plunger and a compression member pivotally connected for movement to the body for compressing a fruit segment.

8 Claims, 2 Drawing Sheets

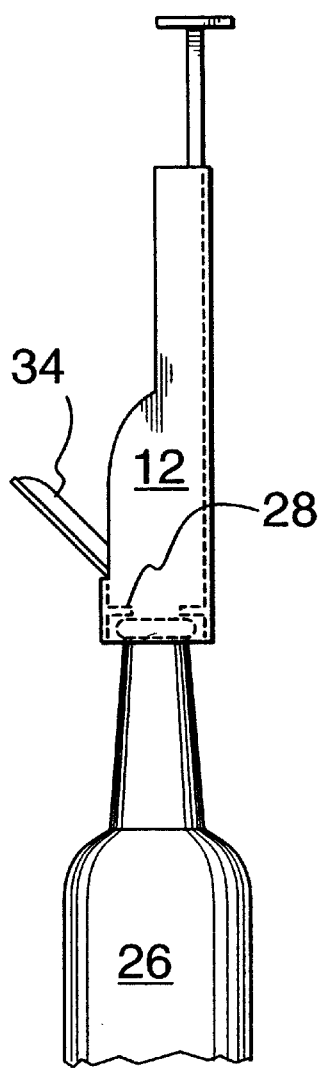
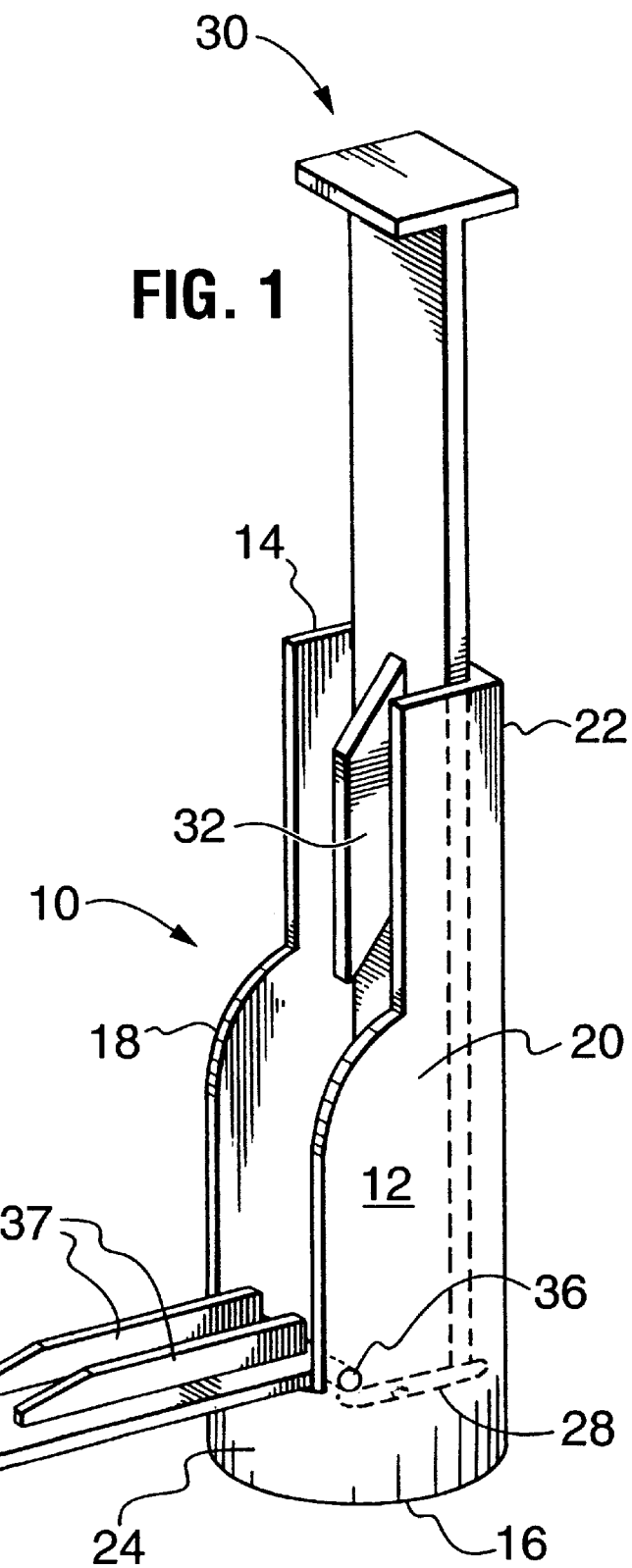

FRUIT INJECTOR

This application claims benefit of Provisional No. 60/234,945 filed Sep. 26, 2000.

FIELD OF THE INVENTION

The present invention relates to a fruit injector and more particularly, the present invention relates to a device suitable for squeezing citrus fruit juice into a container and plunging the rind and other material into the container.

BACKGROUND OF THE INVENTION

As is known in the beverage industry, some beverages are enjoyed by consumers where the beverage may include a section of citrus fruit. Typical is the situation where a slice of lime or lemon is inserted into a beer bottle. As it is presently conducted, the user simply squeezes the section of citrus fruit over the top of the container, in this case a beer bottle, and subsequently inserts the rind into the bottle. This is a rather messy affair and results in the juice being squeezed out over the hand of the user and elsewhere as opposed to being within the bottle itself.

It would be desirable if there were a device suitable for squeezing and subsequently injecting citrus material into a bottle. The present innvention addresses this need.

SUMMARY OF THE INVENTION

One object of the present invention is to provide an apparatus suitable for squeezing and subsequently injecting a fruit segment into a container.

A further object of one embodiment of the present invention is to provide a device for injecting a fruit into a container, comprising: a hollow body having an inlet and an outlet, the outlet adapted for disposition over a container top; a plunger slidably mounted within the body for reciprocal movement within the body; and a compression member moveably mounted to the body to compress the fruit, whereby a compressed fruit may be injected into the container through the outlet of the body.

The body may be composed of suitable material which permits numerous uses and is not susceptible to damage during washing. To this end the body may be compsed of plastic materials such as polyethylene, polystyrene, high impact polystyrene, etc. In order to compress the fruit within the body, a compression member is provided as indicated above. This member may be mounted to the body either by suitable pivot or flex point or may be slidably moveable relative to the body by a raceway and pin arrangement with the concept being that the compression member is moveable from a load position where the piece of fruit is inserted into the body to a compression position where the material is squeezed in order to discharge the juice into the bottle. In terms of the plunger and the moveable member, similar material as that indicated for the body may be employed to construct these elements and the plunger may include stops or other suitable projections thereon for urging a slice into the bottle neck or container top, etc.

In use, the user moves the compression member into a loading position where the segment of fruit is inserted into the body. The compression members then urge against the fruit and the compression action of the compression member together with the fruit being urged against the plunger results in the juice being discharged from the cells of the fruit and into the container top. The plunger may then be activated to plunge or inject the rind into the container through the outlet in the body.

The present invention allows injection of the segment of fruit into a container in the absence of any mess, while maximizing the amount of juice extraction.

Having thus described the invention, reference will now be made to the accompanying drawings illustrating preferred embodiments.

BRIEF DESCRIPTION OF THE DRAWINGS

FIG. 1 is a perspective view of the article according to one embodiment;

FIG. 2 is a side view of the article as positioned about a container; and

Similar numerals in the figures denote similar elements.

DETAILED DESCRIPTION OF THE PREFERRED EMBODIMENTS

Figure 3:
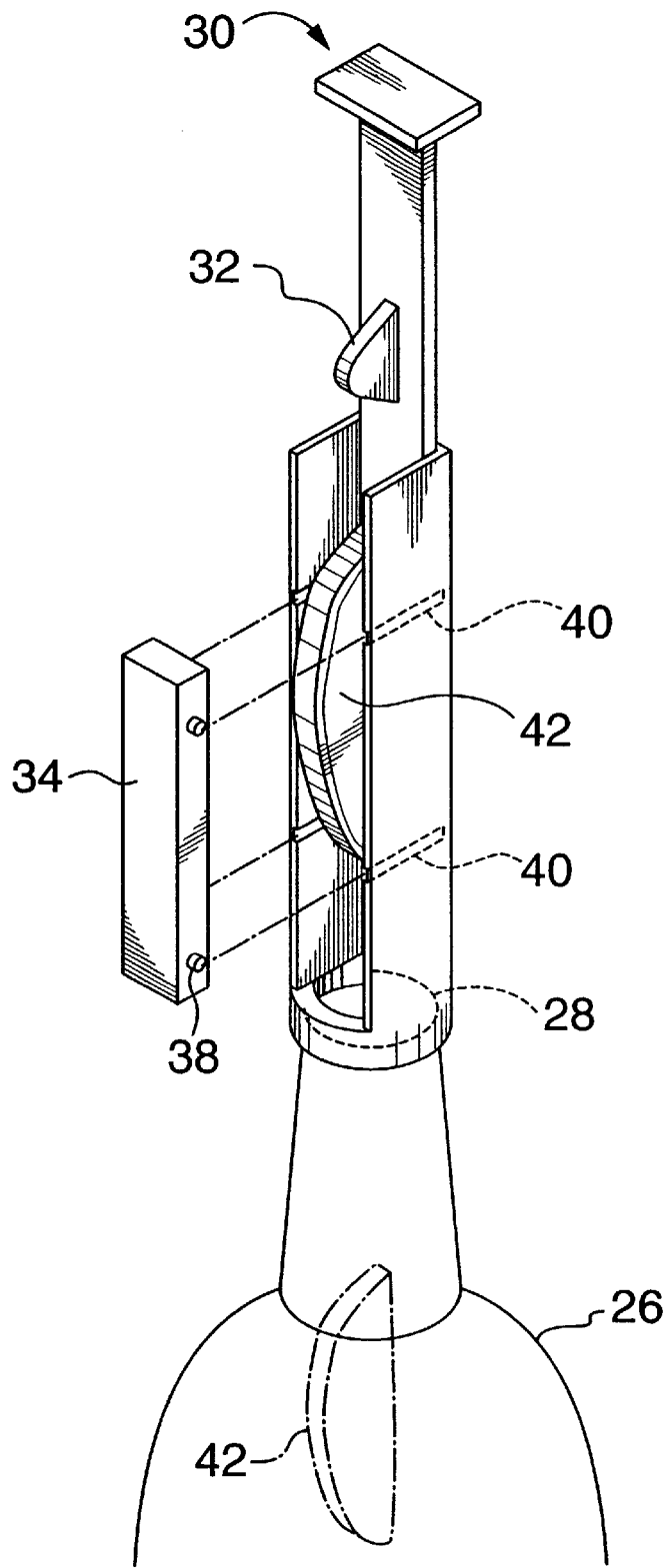
FIG. 3 is a an exploded view of an alternate embodiment of the present invention.

Referring now to the Figures, the overall device is referenced by numeral 10 with the article including central body 12 having an inlet end 14 and an outlet end 16 in opposition. The body 12, according to the embodiment shown in FIG. 1, substantially corresponds to a channel shaped structure with two similarly configured side walls 18 and 20, and a base wall 22, adjacent the hollow body 12, particularly end outlet 16 there is included a ring 24, which ring 24 is configured to receive the top of a container 26, shown in the example as a typical beer bottle. Abutments, stops or projections 28 positioned in ring member 24 are designed as a stop means for stopping the top of the container from being positioned too far within body 12.

Mounted for reciprocal sliding motion within body 12 is a plunger 30 having a shaped configured for slidable movement within body 12. The plunger 30 also includes a projection or stop 32 which is adapted to urge a section of citrus fruit downwardly through the body 12 and subsequently into container 26. The section of fruit is not shown in FIGS. 1 and 2. Adjacent outlet 16 and ring 24 there is provided a compression member 34 which is moveably mounted and more particularly, in example 1, pivotally connected at 36 on body 12 for movement between a loading position wherein a section of fruit can be positioned within the inlet and adjacent stop 32 on plunger 30 and a use position, partially shown in FIG. 2 where the compression member 34 is more positively inclined relative to body 12. The compression member includes at least one projection which extends outwardly from the surface for positioning against a slice of citrus, the projection being denoted by numeral 37.

Turning to FIG. 2, shown is a variation on the embodiments of FIG. 1 and 2, where the compression member 34 is slidably moveable on body 12. In this example, compression member 34 includes pins 38 which are received within raceways 40 within the walls of body 12. In this manner, a section of fruit 42 is positioned between plunger 30 and compression member 34 and compression member 34 is simply urged against the plunger 30 body by the user to squeeze the juice from citrus slice 42 into container 26 and the plunger subsequently activated to insert the citrus rind into the body of the container as shown in dash lines of FIG. 3.

It will be appreciated that projections 36 and 32 will be configured so that they do not interfere with one another.

In another embodiment, the compression member 34 may be connected to body 12 by a living hinge to facilitate pivotal movement.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A device for injecting a fruit into a container, comprising:
   a hollow body having an inlet and an outlet for disposition over a container top and including stop means for positioning a container top in said outlet;
   a plunger slidably mounted within said body for reciprocal movement within said body;
   a compression member moveably mounted to said body to compress said fruit; and
   projection means on said compression member for assisting in compression of said fruit whereby a compressed fruit may be injected into said container through said outlet of said body.

2. The device as set forth in claim 1, wherein said plunger includes a projecting stop for driving said fruit through said body.

3. The device as set forth in claim 1, wherein said compression member is mounted for movement from a first position where said fruit may be charged in said body into a second position where said member compresses a fruit within said body.

4. The device as set forth in claim 1, wherein said body includes a channel.

5. The device as set forth in claim 4, wherein said compression member is moveable within said channel.

6. The device as set forth in claim 5, wherein said compression member is pivotally moveable relative to said channel.

7. The device as set forth in claim 5, wherein said compression member is slidably moveable relative to said body.

8. The device as set forth in claim 5, wherein said body includes raceways for receiving pins on said compression member.

* * * * *